United States Patent
Chang et al.

(10) Patent No.: US 7,472,512 B2
(45) Date of Patent: Jan. 6, 2009

(54) METHOD FOR EXTERMINATING INSECT PESTS

(76) Inventors: Min-Hsien Chang, 1, Lin 2, Ne-Won Village, Fan Ru Shiang, Chia Yi Hsien (TW); Jin-Tien Chang, 1, Lin 2, Ne-Won Village, Fan Ru Shiang, Chia Yi Hsien (TW)

( * ) Notice: Subject to any disclaimer, the term of this patent is extended or adjusted under 35 U.S.C. 154(b) by 46 days.

(21) Appl. No.: 11/761,012

(22) Filed: Jun. 11, 2007

(65) Prior Publication Data

US 2007/0227061 A1 Oct. 4, 2007

(51) Int. Cl.
*A01M 1/20* (2006.01)
*A01M 17/00* (2006.01)
(52) U.S. Cl. .................. 43/132.1; 43/124; 43/144
(58) Field of Classification Search ........... 43/132.1, 43/124, 131, 125, 129, 144
See application file for complete search history.

(56) References Cited

U.S. PATENT DOCUMENTS

| | | | | |
|---|---|---|---|---|
| 803,371 A | * | 10/1905 | Tanner | 43/144 |
| 1,126,216 A | * | 1/1915 | Holman | 43/121 |
| 1,290,544 A | * | 1/1919 | Graumann | 43/124 |
| 1,513,137 A | * | 10/1924 | Tarnok | 43/125 |
| 1,513,138 A | * | 10/1924 | Tarnok | 43/124 |
| 1,534,734 A | * | 4/1925 | Porter | 43/125 |
| 1,614,015 A | * | 1/1927 | Neuls | 43/125 |
| 1,725,650 A | * | 8/1929 | Kobiolke | 43/125 |
| 2,440,996 A | * | 5/1948 | Young | 43/128 |
| 2,467,393 A | * | 4/1949 | Leher | 43/132.1 |
| 2,682,728 A | * | 7/1954 | Nishet et al. | 43/144 |
| 2,729,017 A | * | 1/1956 | Mealey | 43/84 |
| 2,906,056 A | * | 9/1959 | Youngblood | 43/124 |
| 4,005,976 A | * | 2/1977 | Rombach et al. | 43/124 |
| 4,160,336 A | * | 7/1979 | Query et al. | 43/132.1 |
| 4,512,102 A | * | 4/1985 | Long | 43/84 |
| 4,546,563 A | * | 10/1985 | Amburn | 43/132.1 |
| 4,624,070 A | * | 11/1986 | Query et al. | 43/132.1 |
| 4,637,161 A | * | 1/1987 | Turner | 43/132.1 |
| 4,640,044 A | * | 2/1987 | Varnon | 43/132.1 |
| 4,667,436 A | * | 5/1987 | Benson | 43/132.1 |

(Continued)

FOREIGN PATENT DOCUMENTS

JP 03039163 A * 2/1991

(Continued)

*Primary Examiner*—Darren W Ark
(74) *Attorney, Agent, or Firm*—Stites & Harbison PLLC; Marvin Petry

(57) ABSTRACT

A method includes a burning step, a cleaning step, a drugging step, a covering step, and a sealing step to effectively exterminate insect pests inside and outside an ant mound. Specifically, the ant mound is intermittently burnt with flame to kill the insect pests that run out of the ant mound in batches. The ant mound is then removed to expose outlets of ant channels. Next, pharmaceuticals are placed in and surround the outlets of the ant channels. A container is then placed on top of and covers the outlets of the ant channels. The container is sealed to isolate the interior of the container from the exterior of the container, avoiding leakage of gasified pharmaceuticals and preventing entrance of ambient fresh air into the container. Sunlight transmitting the container gasifies the pharmaceuticals in the container, and gasified pharmaceuticals flow into deep channels to kill the insect pests.

2 Claims, 2 Drawing Sheets

U.S. PATENT DOCUMENTS

| | | | | |
|---|---|---|---|---|
| 4,683,673 A * | 8/1987 | Taylor | | 43/139 |
| 4,756,118 A * | 7/1988 | Evans, II | | 43/132.1 |
| 4,768,306 A * | 9/1988 | Hilbun | | 43/125 |
| 4,815,234 A * | 3/1989 | Connolly | | 43/132.1 |
| 4,829,706 A * | 5/1989 | Perry | | 43/125 |
| 4,833,818 A * | 5/1989 | Berta | | 43/132.1 |
| 5,027,546 A * | 7/1991 | Tallon | | 43/132.1 |
| 5,031,355 A * | 7/1991 | Ryan | | 43/130 |
| 5,054,231 A * | 10/1991 | Witherspoon | | 43/132.1 |
| 5,099,598 A * | 3/1992 | Carter | | 43/132.1 |
| 5,109,628 A * | 5/1992 | Ellefson | | 43/129 |
| 5,109,629 A * | 5/1992 | King et al. | | 43/132.1 |
| 5,152,097 A * | 10/1992 | Rhodes | | 43/132.1 |
| 5,154,018 A * | 10/1992 | Livingston | | 43/132.1 |
| 5,319,878 A * | 6/1994 | Moffett et al. | | 43/132.1 |
| 5,325,626 A * | 7/1994 | Jackson | | 43/132.1 |
| 5,394,643 A * | 3/1995 | Schmittmann | | 43/132.1 |
| 5,400,543 A * | 3/1995 | Ideker, Jr. | | 43/139 |
| 5,456,042 A * | 10/1995 | Mathews | | 43/124 |
| 5,502,920 A * | 4/1996 | Takaoka | | 43/132.1 |
| 5,561,942 A * | 10/1996 | Mugno et al. | | 43/129 |
| 5,632,115 A * | 5/1997 | Heitman | | 43/132.1 |
| 5,746,021 A * | 5/1998 | Green | | 43/132.1 |
| 5,860,243 A * | 1/1999 | Stager | | 43/124 |
| 5,870,852 A * | 2/1999 | Stanley | | 43/132.1 |
| 5,881,493 A * | 3/1999 | Restive | | 43/132.1 |
| 5,937,572 A * | 8/1999 | Neumann | | 43/132.1 |
| 6,026,609 A * | 2/2000 | Rawls | | 43/132.1 |
| 6,079,149 A * | 6/2000 | Hastings | | 43/132.1 |
| 6,220,525 B1 * | 4/2001 | McSherdon | | 43/132.1 |
| 6,308,454 B1 * | 10/2001 | Powell | | 43/132.1 |
| 6,523,298 B2 * | 2/2003 | Neumann | | 43/132.1 |
| 6,591,546 B2 * | 7/2003 | Williams et al. | | 43/132.1 |
| 6,604,318 B1 * | 8/2003 | Cassidy | | 43/132.1 |
| 6,606,818 B1 * | 8/2003 | Christmas | | 43/132.1 |
| 6,609,330 B1 * | 8/2003 | Heitman | | 43/132.1 |
| 6,651,378 B2 * | 11/2003 | Baker | | 43/131 |
| 6,655,082 B1 * | 12/2003 | Paltin et al. | | 43/144 |
| 6,688,036 B1 * | 2/2004 | Gunn | | 43/125 |
| 6,865,844 B2 * | 3/2005 | Williams et al. | | 43/132.1 |
| 6,966,145 B1 * | 11/2005 | Taft et al. | | 43/132.1 |
| 7,076,915 B1 * | 7/2006 | Brooks et al. | | 43/132.1 |
| 7,363,746 B2 * | 4/2008 | Spies et al. | | 43/132.1 |
| 2002/0078621 A1 * | 6/2002 | Jones | | 43/124 |
| 2003/0131523 A1 * | 7/2003 | Rawls | | 43/132.1 |
| 2005/0144832 A1 * | 7/2005 | Shaffer | | 43/124 |
| 2005/0155278 A1 * | 7/2005 | Rawls | | 43/132.1 |
| 2006/0230671 A1 * | 10/2006 | Hudson et al. | | 43/124 |
| 2007/0056209 A1 * | 3/2007 | Schuster | | 43/132.1 |
| 2007/0137095 A1 * | 6/2007 | Chen | | 43/132.1 |
| 2007/0283616 A1 * | 12/2007 | Holmes | | 43/132.1 |
| 2008/0127547 A1 * | 6/2008 | Maas | | 43/124 |

FOREIGN PATENT DOCUMENTS

| | | | | |
|---|---|---|---|---|
| JP | 04079832 A | * | 3/1992 | |
| JP | 06078658 A | * | 3/1994 | |
| JP | 2003047385 A | * | 2/2003 | |
| JP | 2005058207 A | * | 3/2005 | |
| WO | WO 2005043998 A1 | * | 5/2005 | |

* cited by examiner

METHOD FOR EXTERMINATING INSECT PESTS

BACKGROUND OF THE INVENTION

1. Field of the Invention

The present invention relates to a method for exterminating insect pests and, more particularly to a method for exterminating insect pests inside and outside a mound built by the insect pests.

2. Description of the Related Art

Mound-building insect pests cause tremendous damage to agriculture and the environment. Conventional methods for exterminating insect pests such as fire ants involve use or not use of chemical pharmaceuticals. Methods not using chemical pharmaceuticals involve boiling water, drowning, and biological pest control, all of which are intended to reduce impact to the environment. According to official record, soaking the area of fire ants by boiling water could only obtain 60% control effect of fire ants with the side effect of damage to surrounding plants. The drowning method requires submerging the whole ant mound in a bucket filled with detergent for more than 24 hours, which does not allow handling of ant mounds of a large area. Furthermore, attack from and escape of fire ants are inevitable while digging and handling the ant mound. The biological pest control utilizes Thelohania solenopsae or parasitic flies to reduce advantages of fire ants, yet this method is still not mature. Two stages are involved when exterminating fire ants with pharmaceuticals. In the first stage, three kinds of pharmaceutical baits approved by the Advisory Council on Agriculture were placed in the feeding area to lure fire ants. In the second stage which began after 10-14 days of the first stage, six kinds of pharmaceuticals approved by the Advisory Council on Agriculture were poured by a machine into channels in the ant mound. According to official record, 98% control effect was achieved. However, success of this method relies on the weather. Specifically, it must not rain in 12 hours after placing the pharmaceutical baits.

SUMMARY OF THE INVENTION

In view of the above problems, the present invention provides a novel method including a burning step, a cleaning step, a drugging step, a covering step, and a sealing step to effectively exterminate insect pests inside and outside the ant mound.

In the burning step, flammable objects and plants surrounding the ant mound are removed, and the ant mound is then intermittently burnt with flame to kill the insect pests that run out of the ant mound in batches.

In the cleaning step, the ant mound is removed to expose outlets of ant channels.

In the drugging step, pharmaceuticals detrimental to the inspect pests are placed in and surround the outlets of the ant channels.

In the covering step, a container is placed on top of and covers the outlets of the ant channels.

In the sealing step, the container is sealed to isolate the interior of the container from the exterior of the container, avoiding leakage of gasified pharmaceuticals and preventing entrance of ambient fresh air into the container. Sunlight transmitting the container gasifies the pharmaceuticals in the container, and gasified pharmaceuticals flow into deep ant channels with expanding air to kill the insect pests.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
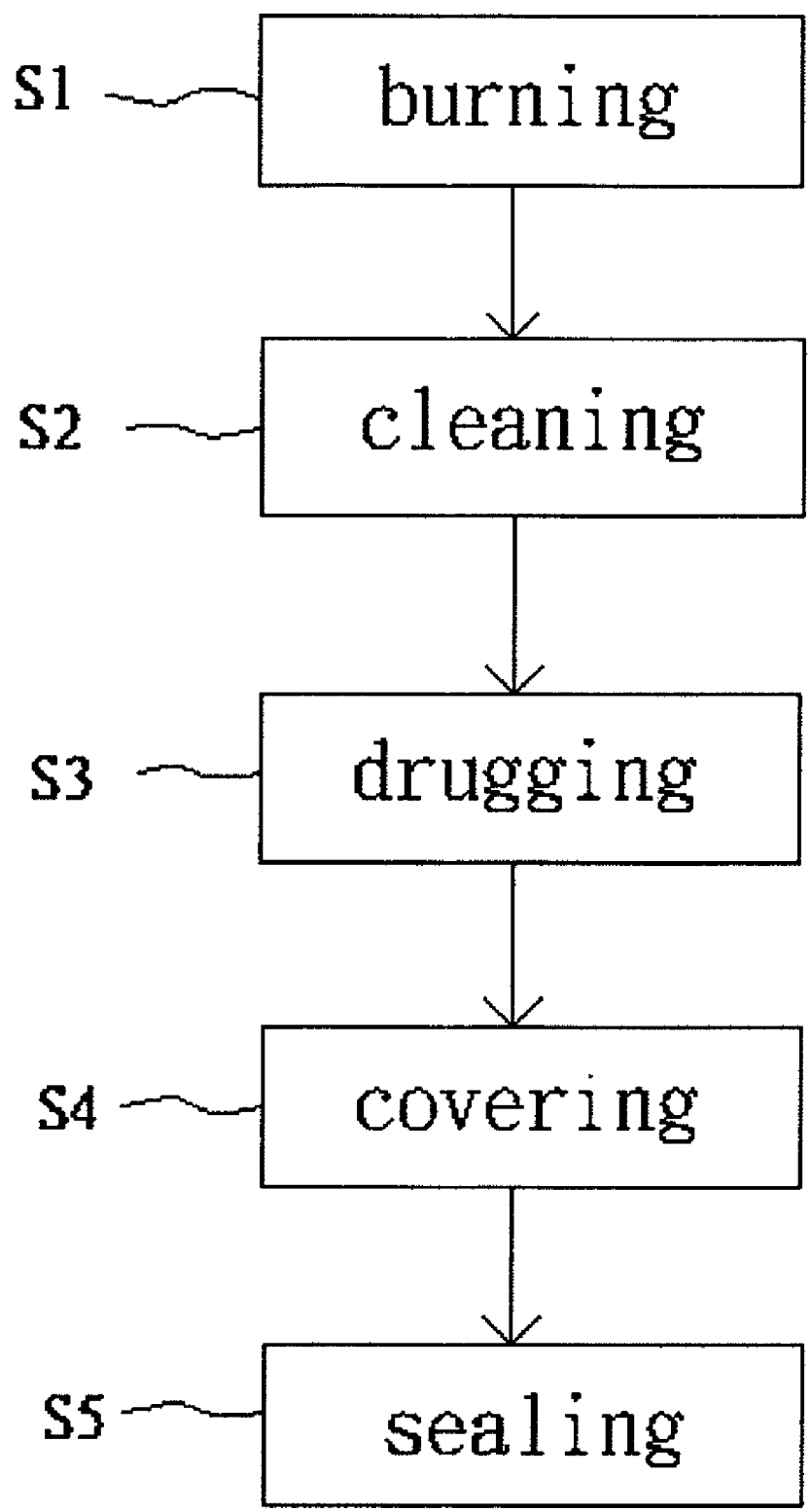
FIG. 1 is a schematic flowchart illustrating a method for exterminating insect pests in accordance with the present invention.

Referring to FIG. 1, a method in accordance with the present invention includes a burning step S1, a cleaning step S2, a drugging step S3, a covering step S4, and a sealing step S5 for exterminating insect pests such as fire ants in an ant mound or the like.

In the burning step S1, flammable objects and plants surrounding the ant mound are removed, and the ant mound is then intermittently burnt with flame. This will kill the insect pests that run out of the ant mound in batches.

In the cleaning step S2, the ant mound is removed with a suitable tool such as a hoe to expose outlets of ant channels.

In the drugging step S3, pharmaceuticals detrimental to the inspect pests are placed in and surround the outlets of the ant channels. Suitable pharmaceuticals include permethrin, cypermethrin, deltamethrin, fenvalerate, carbaryl, and propoxur approved by the Advisory Council on Agriculture.

Figure 2:
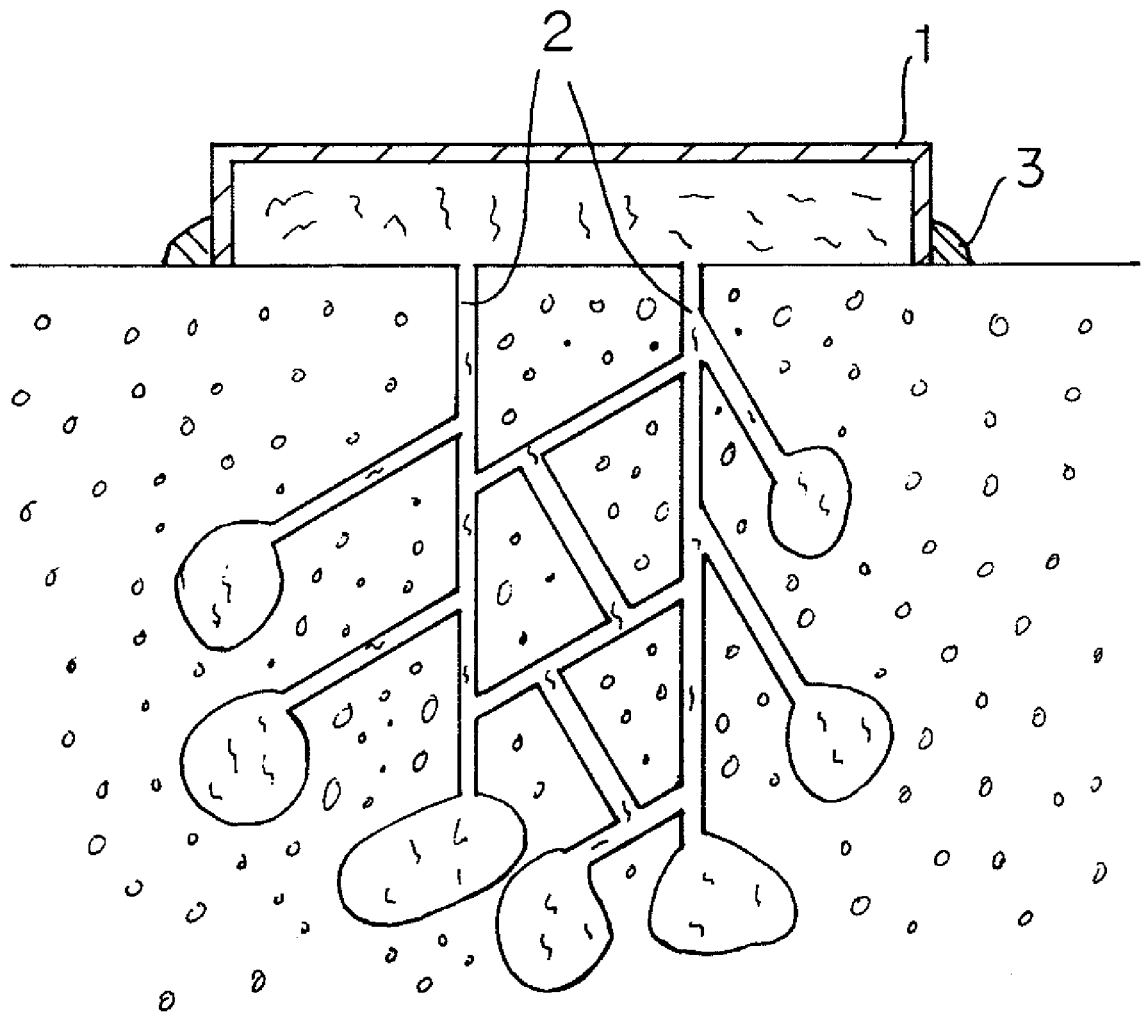
FIG. 2 is a schematic view illustrating operation of the method for exterminating insect pests in accordance with the present invention.

With reference to FIG. 2, in the covering step S4, a container 1 is placed on top of and covers the outlets of the ant channels 2. Preferably, the container 1 is a metal basin with good heat absorbing properties. Sunlight transmitting the container 1 gasifies the pharmaceuticals in the container 1, and gasified pharmaceuticals flow into deep channels with expanding air to kill the insect pests.

In the sealing step S5, the container 1 is sealed with sand 3 to isolate the interior of the container 1 from the exterior of the container 1. This avoids leakage of gasified pharmaceuticals and prevents entrance of ambient fresh air into the container 1.

According to the above, the method in accordance with the present invention includes a burning step S1 in which the ant mound is intermittently burnt to kill the insect pests outside the ant mound and the insect pests moving out of the ant channels in batches. Then a cleaning step S2, a drugging step S3, a covering step S4, and a sealing step S5 are carried out to kill the insect pests and pupa remained in the ant channels. The insect pests inside and outside the ant mound are, thus, effectively exterminated.

Although specific embodiments have been illustrated and described, numerous modifications and variations are still possible without departing from the teachings of the invention. The scope of the invention is limited by the accompanying claims.

What is claimed is:

1. A method for exterminating insect pests comprising the steps of:
   a burning step: removing flammable objects and plants surrounding an ant mound and then intermittently burning the ant mound with flame;
   a cleaning step: removing the ant mound with a suitable tool to expose outlets of ant channels;

a drugging step: placing pharmaceuticals detrimental to inspect pests in the ant mound in and surrounding the outlets of the ant channels;

a covering step: placing a container on top of the outlets of the ant channels; and a sealing step: sealing the container to isolate an interior of the container from an exterior of the container, avoiding leakage of gasified pharmaceuticals and preventing entrance of ambient fresh air into the container.

2. The method as claimed in claim 1 wherein the container is a metal basin with good heat absorbing properties.

\* \* \* \* \*